Dec. 6, 1960 C. DILLARD Re. 24,902

FISH HOOK EXTRACTORS

Original Filed Sept. 9, 1954

CARVEL DILLARD,
INVENTOR.

BY George V. Smyth.
ATTORNEY

United States Patent Office

Re. 24,902
Reissued Dec. 6, 1960

24,902

FISH HOOK EXTRACTORS

Carvel Dillard, 11229 Inglewood Ave., Lennox, Calif.

Original No. 2,797,523, dated July 2, 1957, Ser. No. 454,908, Sept. 9, 1954. Application for reissue Oct. 20, 1958, Ser. No. 768,506

14 Claims. (Cl. 43—53.5)

Matter enclosed in heavy brackets [ ] appears in the original patent but forms no part of this reissue specification; matter printed in italics indicates the additions made by reissue.

This invention relates to fish-hook extractors or dislodgers and the principal object of the invention is the provision of a device which will quickly and efficiently extract fishhooks of various sizes from the mouth or gullet of a fish and without the necessity of the fisheman handling or contacting the fish.

The extractor of the present invention comprises, in the broadest aspects thereof, a locating or positioning element which coacts with the embedded hook to locate and firmly hold the same in a predetermined position regardless of the size of the hook, and a stripper element relatively movable into and through the predetermined position to strip the impaled flesh of the fish from the hook.

The locating and positioning element includes means which coact with the fishline and the hook to guide the hook into the predetermined position and then, so long as the line is maintained somewhat taut, holds the hook in said position for the subsequent action of the stripper element. To insure proper action of the stripper element, the latter includes means cooperative with means carried by the positioning element and its associated elements to guide the stripper element through the predetermined position.

The stripper element is shaped to partially embrace the barbed end of the hook and is formed with an arcuate leading edge which slidably engages the hook for separating the hook from the impaled flesh of the fish. In the now preferred form of the present invention the positioning element and stripper element are normally held spaced apart but are relatively movable to bring the stripper element into working engagement with the hook as located and held by the positioning element. In the normal position of the stripper element the same is at least partially embraced or received within a member shaped to permit ease of insertion of the extractor into the mouth and gullet of the fish. Thus, the stripper element creates little if any interference to the insertion or entrance of the extractor into the mouth or gullet and reduces further injury to the fish as the hook is removed.

In the extractor of the present invention the hook is not forced or torn from the mouth of the fish for the stripper element as it moves along the end of the hook merely separates the hook from the flesh of the fish. As will be understood, this reduces to a minimum injury to the fish. As the hook can be extracted from the fish without the fisherman handling the fish this feature permits many fishes hooked to be removed and then returned to the water as would be done, for example, if the fish was not of a legal size.

Figure 1:
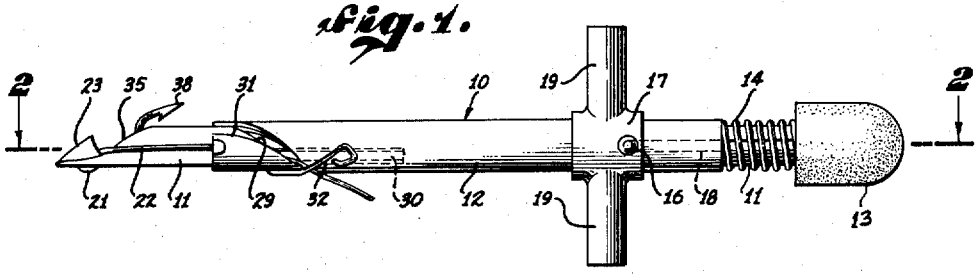
Figure 2:
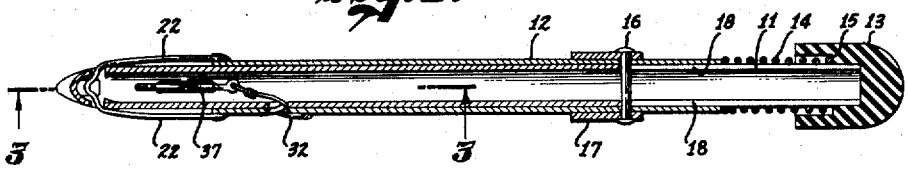
Figure 3:
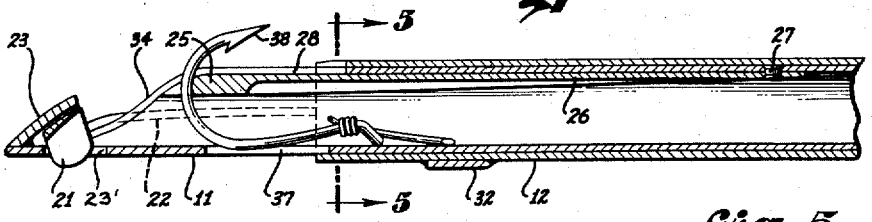
Figure 4:
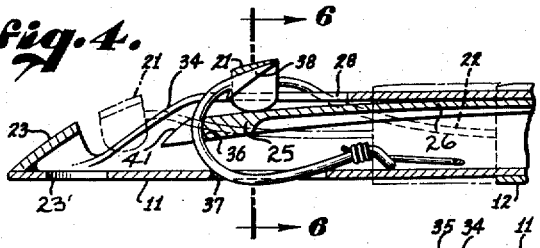
Figure 5:
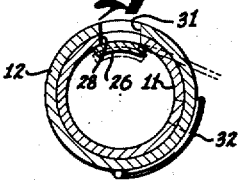
Figure 6:
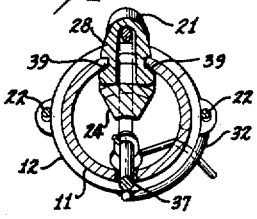
Figure 7:
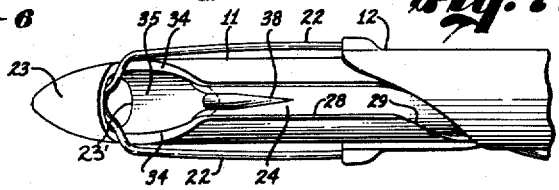

Other features and advantages of the present invention will be apparent from the following description taken in connection with the accompanying drawing, in which:

Figure 1 is a side elevational view of the extractor of the present invention showing a fish hook held by the positioning member, Figure 2 is a top plan view partly in section to more clearly illustrate the component parts of the exterior, Figure 3 is a section on an enlarged scale taken along line 3—3 of Figure 2, Figure 4 is a fragmentary sectional view on an enlarged scale showing the stripper element in broken lines intermediate its normal position and the locating member and in solid lines in the position it occupies at the termination of the extracting operation, Figure 5 is a section taken along line 5—5 of Figure 3 with the hook omitted, Figure 6 is a section taken along line 6—6 of Figure 4, and Figure 7 is a fragmentary plan view on an enlarged scale.

The extractor or dislodger of the present invention, referring now to the drawing and more particularly to Figure 1 thereof, comprises a body portion 10 including a pair of telescopically mounted tubular parts 11 and 12, the innermost part 11 coaxially projecting outwardly of the part 12 at the opposite ends thereof. The one projecting portion of the part 11 is fitted at the end thereof with a cap 13 of some suitable resilient material such as rubber. The cap is formed with a thickened end wall forming a pad to engage the palm of the hand of the user as will be hereinafter explained.

A coiled spring 14 seating on an annular shoulder 15 formed within the bore of the cap 13 and sleeving the projecting portion of the part 11 acts to normally urge the part 12 to the left as viewed in Figure 1. This movement of the part 12 is limited by a rivet 16 or the like diametrically passing through the telescoping parts and mounting a sleeve 17 to the part 12 adjacent the one end thereof. The rivet is passed through openings formed in the member or part 12 and a pair of elongate slots 18 diametrically formed in the wall of the part 11. It will now be seen that the shank of the rivet acts as a stop coacting with the inner end of the slots 18 to limit movement of the part 12 relative to the part 11 under the urgings of the spring 14.

The sleeve 17 integrally carries a pair of oppositely projecting bars 19 forming a cross-head to be engaged by the fingers of the user as the pad formed by the cap 13 rests in the palm of the user's hand for drawing the part 12 to the right as viewed in the figures of the drawing. This movement of the member 12 actuates a stripper element comprising a channel or U-shaped member 21 of a suitable resilient metal mounted to the part 12 by a pair of resilient arms 22. The arms 22 have their ends suitably anchored to the opposite sides of the part 12 and extend outwardly from the one end of the part to mount the stripper element 21 longitudinally projected beyond the end of the part 12 opposite to the spring 14.

In the normal position of the stripper element the same is received within and at least partially embraced by a guide member 23 formed at the end of the member 11 and shaped to permit easy insertion of the extractor into the mouth and gullet of the fish. The guide member 23 includes an opening 23' as best seen in Figure 3, through which a portion of the element 21 projects as the latter moves into the member 23. As the stripper element 21 is normally embraced by the guide member 23, the stripper element does not interfere with the insertion of the extractor into the mouth or gullet of the fish. This construction as will be understood, tends to eliminate undue tearing or mutilation of the tissues of the fish.

It should be pointed out here that the resilient arms 22 mounting the stripper element are of such a length relative to the relative coaxial movement of the part 11 and 12 as determined by the length of the slots 18 that the stripper element 21 is snugly received within the guide element 23 when the rivet 16 is engaged with the inner ends of the slot 18. This eliminates all distortion of the resilient arm 22 in the normal position of the parts. It will also be seen now that the slots 18 also serve to properly orient the tubular parts 11 and 12 for the walls of the slots, coacting with the rivet 16, prevent relative rotation of the tubular parts forming the body member 10.

The stripper element 21 coacts with a positioning member 24 which is carried by the tubular part 11 to remove a hook embedded within the mouth or gullet of the fish. In the illustrated embodiment of the present invention, the positioning member 24 comprises a bifurcated head element 25 integrally formed at one end of a resilient strip 26, the opposite end of which is anchored within the bore of the tubular part 11 by a rivet or similar fastening element 27. The resilient strip 26 and the head 25 are shaped to lay closely against the inner wall surface of the tubular part 11 and normally close a slot 28 longitudinally extending inwardly of the wall of the part and merging with a helical slot 29 which extends about the wall of the part to a point substantially 180° displaced from the slot 28. The slot 29 in turn merges with a linear or longitudinally extending slot 30 formed in the wall of the part 11 and extending substantially parallel with the slot 28. The tubular part 12 is also formed with a helical slot 31 which registers with the slot 29 when the parts 11 and 12 are in their normal position relative to each other as defined by the rivet 16 and the slot 18. The helical slots form an entrance opening for a fish line to permit the line to be moved into the inner part 11 as shown in Figure 3 of the drawing.

In the operation of engaging the extractor about the line on which the fish is hooked the resilient strip 26 carrying the bifurcated head 25 flexes inwardly to permit passage of the fish line into the tubular part 11. In this operation the resilient strip 26 twists somewhat as it flexes under the urging of the fish line and thus offers no resistance to entrance of the line.

To facilitate the insertion of the fishline into the registering helical slots, the tubular part 12 carries a guide element 32 in the form of a resilient wire having one end anchored adjacent the inner end of the slot 31 to extend across the same after which it is bent back upon itself to form a closed loop. By merely slipping the line under the loop of the guide element the line is guided by the same into the registering slots and is held against separation from the extractor by the guide element once the line is entered into the registering helical slots.

With the fishline now disposed within the tubular part 11 the extractor is now moved downwardly of the line and the guide member 23 inserted into the mouth of the fish and engaged against the flesh of the mouth or gullet depending where the fish is hooked. The line is now drawn taut to move the shank of the hook 23 into a position somewhat as pictured in the Figure 3 of the drawing. As the line and hook move toward such a position during the inserting operation, they are guided by smoothly contoured enlargements 34 integrally formed at the opposite edges of the opening 35 formed in the tubular part 11 into the notch of the bifurcated head 25. These enlargements 34, as best seen in Figure 2, also act to prevent the line from engaging between the one side or the other of the head 25 and the contiguous inner wall surface of the tubular part 11.

The notch of the head 25 is formed with a curved wall surface 36 which is engaged by the bow of the hook as the latter moves between the bifurcation to cam the hook downwardly, as viewed in Figure 3, to move the shank of the hook into an elongate slot 37 formed in the wall of the tubular part 11 opposite the opening 35. The disposition of the bow of the hook between the bifurcations of the head and the reception of the shank portion in the slot 37 aligns the hook medially of the extractor and locates the hook in a predetermined position. So long as the line on the extractor is held taut the hook will be firmly held in this predetermined position with the barbed portion 38 of the hook disposed as seen in the Figure 3.

With the hook now located in the position predetermined by the head 25 and slot 37 the fisherman, as above explained, coaxially moves the telescoping parts 11 and 12 to move the stripper element 21 from its normal position within the guide element 23 to the right as viewed in Figure 4. The stripper element 21 as it moves into engagement with the barbed portion of the hook straddles the same and if the hook is not properly located, forces the same between the bifurcations of the head 25, to permit the arcuate leading edge to cleanly separate the impaled flesh of the fish from the hook. In this operation the line is held stationary and the slot 30 permits relative movement of the parts 11 and 12 without pinching or cutting the line.

To insure that the stripper element 21 moves through a preselected path as it engages the hook positioned between the bifurcations of the head 25, the present invention provides guide means partially carried by the stripper element and partially carried by the tubular part 11. These guide means, in the now preferred embodiment of the invention, includes grooves 39 formed along the opposite flanges of the stripper element 21, as best seen in Figure 6, in which the defining edges of the slot 28 engage as the stripper element is moved into the open end of the slot. The bifurcated head 25 is formed with a sloping or inclined face 41 which serves to guide the stripper element into the position necessary to insure reception of the edges of the slot 28 into the grooves 39. It will be seen that as the stripper element moves into engagement with the inclined face of the head 25, the resulting camming action flexes inwardly the strip 26 as the arms 22 are oppositely flexed to move the stripper element upwardly as viewed in Figures 3 and 4.

It will be seen that reception of the defining edges of the slot 28 in the grooves 39 will guide the stripper element along the slot 28 and thus hold the same in a predetermined path as the same moves over the hook embedded in flesh of the fish. Furthermore, the reception of the edges of the slot in the grooves 39 holds the stripper element against twisting movement and the stripper element, as it straddles the hook in its movement thereover, acts to hold the hook against rocking movement during the actual stripping operation.

In the stripping operation the bow portion of the stripper element 21 is held tightly engaged with the hook and will, as it is moved in the path defined by the edges of the slot 28, cam the hook downwardly, as viewed in Figures 3 and 4, to move the shank portion of the hook through the slot 37, if necessary because of the size of the hook. It will thus be seen that the extractor of the present invention can be efficiently used with a relatively large range of hook sizes.

As the resilient strip 26 mounting the head 25 tends to hold the same in a position underlying the inner wall surface of the part 11 and as the arms 22 normally tend to hold the stripper element medially of the part 11, the arcuate edge of the stripper element firmly engages the barbed end of the hook as it slides thereover during the stripping operation so that the stripper element separates the impaled flesh from the hook with minimum injury to the impaled flesh. As there is thus no tearing of the flesh of the fish as the hook is extracted, additional injury to the fish is negligible. The extractor thus greatly enhances the successful restoration of under-sized fish to the water.

Once the hook has been extracted from the fish it is a simple matter to disengage the extractor from the fish line. This is done by first disengaging the hook from the head 25, after which the line is grasped just rearwardly of the guide 32 and removed by giving the same a sharp tug with a forward motion to move the line under the guide 32 and through the aligned slots 29 and 31. In this operation, the line is engaged between the resilient strip 26 and moves between the head 25 and the contiguous wall of the member 11, the head 25 twisting slightly to permit the line to separate from the extractor.

The overall dimensions of the extractor of the present invention are relatively small and the extractor can be very conveniently carried within the tackle box of the fisherman or even in a pocket of his clothing if he wishes. The extractor as further shown is very easily applied to the line and once properly applied to the line is automatic in operation for the various parts coact with the line and hook to extract the latter from the mouth or gullet of the fish with little or no additional injury to the fish.

Although the now preferred embodiment of the present invention has been shown and illustrated herein it is to be understood that the invention is not to be limited thereto for it is susceptible to changes in form and detail within the scope of the appended claims.

I claim:

1. A fish hook extractor, comprising: a pair of relatively movable telescoping tubular members having line entrance slots formed in the walls thereof; said slots registering with each other in one position of coaxial adjustment of said members, an elongate resilient strip having one end fixed within the inner telescoping member and normally closing the entrance slot formed in the wall thereof; a bifurcated element at the free end of said elongate strip for engaging and holding a fish hook; a stripper member; resilient arms mounting said stripper member to the outermost tubular member to project longitudinally beyond the one end thereof; means for guiding said stripper member for movement in a preselected path as said telescoping members are moved relative to each other; and means for relatively moving said telescoping members whereby said stripper member moves over a hook engaged and held by said bifurcated member to strip the impaled flesh of the fish therefrom.

2. A fish hook extractor, comprising: a pair of telescoping tubular members the innermost member extending outwardly beyond the opposite ends of the outermost member, said members having line entrance slots formed in the walls thereof whereby a fish line may be moved into said members; means carried by the one end of said innermost member forming a guide member to facilitate entrance of the extractor into the mouth of a fish as the extractor is moved over the line to the embedded hook; means carried by said innermost member for engaging and locating the fish hook attached to said line; stripper means carried by said outermost member; resilient means normally holding said telescoping members relative to each other to normally dispose said stripper means within said guide means; means for guiding said stripper means for movement over a hook engaged and held by said locating means; and means for applying oppositely directed forces to said telescoping members to relatively move the same whereby said stripper means moves over said engaged hook to separate the same from the impaled flesh of the fish.

3. A fish hook extractor, comprising: a hollow body member; a bifurcated member; means for resiliently mounting said bifurcated member in said body member and normally holding the same in a preselected position relative to said body member; means for guiding a fish hook between the bifurcations of said member; a stripper element movable into engagement with a hook held between the bifurcations of said member, said element as it engages said bifurcated member moving the same out of said preselected position to dispose the bow of said hook in a positioning slot formed in said body member; the walls of said slot coacting with said bifurcated member to locate and hold said hook in a predetermined position; and guide means carried by said stripper element and coacting with guide means carried by said body member for holding said stripper element in a path of movement in which said element moves over said hook in said predetermined position to separate the latter from the impaled flesh of a fish.

4. A fish hook as defined in claim 3 in which said stripper element comprises a U-shaped element adapted to partially embrace said engaged hook and having an arcuate leading edge to strip the impaled flesh of the fish from said hook as said element moves thereover.

5. A fish hook extractor, comprising: a pair of relatively movable telescoping tubular members having fish line entrance slots formed in the walls thereof mutually registering with each other in a normal relative position of said members; an elongate resilient strip having one end fixed within the innermost telescoping member; a bifurcated element at the free end of said elongate strip and coacting therewith to normally close the entrance slot formed in the wall of said innermost member; a stripper member; and resilient arms mounting said stripper member to the outermost member to project longitudinally beyond the one end thereof; said stripper member moving into engagement with said element and moving the same inwardly to open said slot normally closed thereby as said tubular members are relatively moved in opposite directions whereby said stripper member moves through said slots and over a hook engaged and held by said bifurcated element to separate the hook from the impaled flesh of the fish.

6. A fish hook extractor, comprising: a pair of telescoping hollow members, the innermost member being of a length greater than the outermost member, said members having line entrance slots formed in the walls thereof; a cross head mounted to the outermost member adjacent one end thereof; a resilient pad carried by the innermost member at the end thereof adjacent said cross head; means, including resilient means, normally holding said members in a position in which said slots register with each other; an elongate resilient strip having one end fixed within the inner telescoping member and normally closing the entrance slot formed in the wall thereof; a bifurcated element at the free end of said elongate strip between the bifurcations of which a fish hook is to be positioned; a U-shaped stripper member; resilient arms mounting said stripper member to the outermost member to project longitudinally beyond the one end thereof; and means for guiding said stripper member for movement over a hook engaged and held by said bifurcated member when said telescoping members are slidably moved relative to each other by oppositely directed forces applied to the cross head and pad, respectively, whereby said stripper member moves over said hook to separate the same from the impaled flesh of the fish.

7. A fish hook extractor, comprising: a pair of telescoping tubular members having line entrance slots formed in the walls thereof whereby a fishline may be moved into said members; a bifurcated element for engaging and holding a fishhook attached to a line resiliently mounted within the innermost telescoping member and normally closing the line entrance slot therein; stripper means carried by the other of said members; means for guiding said stripper means for movement over a hook engaged and held by said bifurcated element; and means for applying oppositely directed forces to said members to relatively move the same, whereby said stripper means moves over said engaged hook to separate the same from the impaled flesh of the fish; said stripper means including means engageable with said bifurcated element and operable to cam the same inwardly as said members are relatively moved, whereby said stripper element moves into the entrance slot normally closed by said bifurcated element.

*8. A fish hook extractor comprising: an elongate member having an end adapted to be received within the bow of the fish hook to be extracted; first means adapted to dispose said end of said member within said bow, yield-*

*ably adjacent the inside of fishhook barb and outside the flesh of the fish in which the hook is embedded; an element movable relative to said member, said element being recessed to receive and to pass over in close fitting engagement the back side of the barbed end of the hook; and second means, said second means being connected to said element to dispose the latter in a position spaced axially beyond said yieldably disposed end of said member and radially beyond the fishhook bow, and said second means being movable axially relative to the first means, whereupon when the second means is so moved relative to the first means in a direction away from said yieldably disposed end of the member, it draws said element from its said disposed position axially toward and over the back side of the barbed hook point to press the barb against said yieldably disposed end of the said member, thereby stripping the flesh from the hook.*

*9. A fish hook extractor comprising: an elongate member having an end adapted to be received within the bow of the fish hook to be extracted; means adapted to dispose said end of said member within said bow, yieldably adjacent the inside of fish hook barb and outside the flesh of the fish in which the hook is embedded, said means further including structure to orient the hook in a plane substantially normal to the direction of yielding of said end; an element movable relative to said member, said element being recessed to receive and to pass over in close fitting engagement the back side of the barbed end of the hook; and second means, said second means being connected to said element to dispose the latter in a position spaced axially beyond said yieldably disposed end of said member and radially beyond the fish hook bow, and said second means being movable axially relative to the first means, whereupon when the second means is so moved relative to the first means in a direction away from said yieldably disposed end of the member it draws said element from its said disposed position axially toward and over the back side of the barbed hook point to press the barb against said yieldably disposed end of the said member, thereby stripping the flesh from the hook.*

*10. A fish hook extractor comprising: an elongate tubular element, said element being open at one end and being axially slotted a predetermined distance from said end; means disposed in said slotting to close the same, said means being yieldable at said tube end in a radially inward direction; means to orient the hook in a plane substantially normal to the direction of yielding of said first mentioned means; a member extendable from said open tube end, said member being shaped to slide over the back side of the barbed point of the fish hook, said tubular element being orificed at a point spaced axially from its said open end to pass a fish line therethrough; and elongate means connected to said member, said elongate means being slidable longitudinally relative to the tubular element, whereby, upon the last said means being so slid relative to the tubular element away from said open tube and, the member is drawn axially relative to the tube and over the fish hook to press the latter against the first said means to cause the latter to yield radially inwardly, stripping the flesh impaled upon the hook.*

*11. A device for extracting a fish hook having a line and connected to a fish line from the throat or gullet of a fish, said device comprising: an elongate element, said element being open at one extremity and including a hollowed portion extending axially from said open extremity wherein the line end of the fish hook may be received, the wall of the element defining said hollowed portion terminating at least in part in an edge surface lying in a plane intersecting the axis of the element at an acute angle, said wall further being slotted longitudinally from the said surface which extends farthest into the body of said element, thereby preceding said slotting by a pair of surfaces converging from the open extremity toward said slotting to form a mouth leading to the slotting, said wall also being oppositely slotted to receive part of the fish hook to orient the latter in a plane substantially normal to the first mentioned slotting; a thin-walled elongate member, said member being mounted within said hollowed portion of said element to cover at least a portion of said first mentioned slotting and to yield radially inwardly, under pressure at its end nearest said mouth; a passage in said element from said hollowed portion to the exterior of the element, said passage being disposed more remotely from said open extremity of the element than the slotting, said passage serving to permit the fish hook string to be drawn therethrough; a stripper cap, said cap being shaped to be adapted to slide axially over the outside of the barbed end of the fish hook when the latter is disposed in the slotting and against said member; a pair of connecting elements, the last elements being secured to and diverging from said cap for a predetermined distance and thereafter extending for a further distance parallel to said elongate element; first means slidable longitudinally in relation to the latter, said first means being extensibly joined to said connecting elements and normally spring biased in reference to said elongate element to dispose said cap at the entrance to said mouth; and second means to enable said elongate element and first means to be manually displaced relative to each other by overcoming said spring bias, whereby, when the string of a fish hook is drawn through the passage to the point where the hook is brought into said mouth and onto said member, and said cap is also drawn into the said mouth and over the outside of the hook to press the hook barb against the member, the latter is caused to yield radially inwardly, and the flesh of the fish is stripped from the barb of the hook upon which it is impaled.*

*12. A device for extracting a fish hook having a line and connected to a fish line from the throat or gullet of a fish, said device comprising: an elongate element, said element being open at one extremity and including a hollowed portion extending axially from said open extremity wherein the line end of the fish hook may be received, the wall of the element defining said hollowed portion terminating at least in part in an edge surface lying in a plane intersecting the axis of the element at an acute angle, said wall further being slotted longitudinally from the said surface which extends farthest into the body of said element, thereby preceding said slotting by a pair of surfaces converging from the open extremity toward said slotting to form a mouth leading to the slotting, said wall also being oppositely slotted to receive part of the fish hook to orient the latter in a plane substantially normal to the first mentioned slotting; a thin-walled elongate member, said member being mounted within said hollowed portion of said element to cover at least a portion of said first mentioned slotting and to yield radially inwardly, under pressure at its end nearest said mouth; a passage in said element from said hollowed portion to the exterior of the element, said passage being disposed more remotely from said open extremity of the element than the slotting, said passage serving to permit the fish hook string to be drawn therethrough; a stripper cap, said cap being shaped to be adapted to slide axially over the outside of the barbed end of the fish hook when the latter is disposed in the slotting and against said member; a pair of connecting elements, the last elements being secured to and diverging from said cap for a predetermined distance and thereafter extending for a further distance parallel to said elongate element; said connecting elements being slidable longitudinally in relation to the said element and normally spring biased in reference to said elongate element to dispose said cap at the entrance to said mouth; and means to enable said elongate element and said connecting elements to be manually displaced relative to each other by overcoming said spring bias, whereby, when the*

*string of a fish hook is drawn through the passage to the point where the hook is brought into said mouth and onto said member, and said cap is also drawn into the said mouth and over the outside of the hook to press the hook barb against the member, the latter is caused to yield radially inwardly, and the flesh of the fish is stripped from the barb of the hook upon which it is impaled.*

*13. A fish hook extractor, comprising: a hollow body member having a positioning slot formed in the wall thereof; a resilient member mounted in said hollow body member having at least one end; said body member having means for guiding a fish hook against said one end of said resilient member; a stripper element movable into engagement with the hook held against said one end of said resilient member moving the same to dispose the bow of said hook in the positioning slot in said body member, the walls of said slot co-acting with said resilient member to locate and hold the hook in a predetermined position; and guide means carried by said stripper element and co-acting with the guiding means of said body member for holding said stripper element in a path of movement in which said element moves over said hook in said predetermined position to separate the latter from the impaled flesh of a fish.*

*14. A fish hook extractor, including, a hollow body member; a bifurcated member; means for mounting said bifurcated member in said body member and normally holding the same in a preselected position relative to said body member; and a stripper element mounted on said hollow body member and movable into engagement with a hook held between the bifurcations of said bifurcated member, said stripper element including resilient guide means causing said stripper element to force the hook against the bifurcations of said member as said stripper member moves over the hook to separate the latter from the impaled flesh of the fish.*

References Cited in the file of this patent or the original patent

UNITED STATES PATENTS

| | | |
|---|---|---|
| 430,849 | Groth | June 24, 1890 |
| 2,054,236 | Behr | Sept. 15, 1936 |
| 2,578,289 | Danielson | Dec. 11, 1951 |
| 2,670,561 | Howorth et al. | Mar. 2, 1954 |
| 2,695,471 | Imberti | Nov. 30, 1954 |

FOREIGN PATENTS

| | | |
|---|---|---|
| 235,367 | Great Britain | June 18, 1925 |